United States Patent
Miikki et al.

(10) Patent No.: US 11,479,917 B2
(45) Date of Patent: Oct. 25, 2022

(54) METHOD FOR MANUFACTURING A PACKAGING MATERIAL AND A PACKAGING MATERIAL MADE BY THE METHOD

(71) Applicant: Stora Enso OYJ, Helsinki (FI)

(72) Inventors: Nina Miikki, Imatra (FI); Petri Sirvió, Imatra (FI); Kaj Backfolk, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 394 days.

(21) Appl. No.: 15/125,616

(22) PCT Filed: Mar. 13, 2015

(86) PCT No.: PCT/IB2015/051851
§ 371 (c)(1),
(2) Date: Sep. 13, 2016

(87) PCT Pub. No.: WO2015/136493
PCT Pub. Date: Sep. 17, 2015

(65) Prior Publication Data
US 2016/0376750 A1    Dec. 29, 2016

Related U.S. Application Data

(60) Provisional application No. 61/952,978, filed on Mar. 14, 2014.

(51) Int. Cl.
*D21H 27/10* (2006.01)
*B32B 27/10* (2006.01)
(Continued)

(52) U.S. Cl.
CPC .............. *D21H 27/10* (2013.01); *B32B 7/12* (2013.01); *B32B 27/10* (2013.01); *B32B 27/32* (2013.01);
(Continued)

(58) Field of Classification Search
CPC .... B32B 2307/4023; B32B 2307/4026; B32B 2307/75; B32B 2439/70; B32B 27/10;
(Continued)

(56) References Cited

U.S. PATENT DOCUMENTS 4,521,492 A    6/1985 Allen
4,931,359 A *  6/1990 Yagi .................... G03G 5/0217
                                                  427/121
(Continued)

FOREIGN PATENT DOCUMENTS

CN    1265625 A    9/2000
CN    102753757 A    10/2012
(Continued)

OTHER PUBLICATIONS

International Searching Authority, International Search Report, PCT/IB2015/051851, dated Jun. 22, 2015.
(Continued)

*Primary Examiner* — James M Mellott
(74) *Attorney, Agent, or Firm* — Greer, Burns & Crain, Ltd.

(57) ABSTRACT

The invention refers to a method to produce a packaging material comprising the steps of; treating at least one surface of a paperboard substrate with a binder and with a metal salt, printing at least a part of said treated surface with ink, and applying at least one polymer layer on said printed surface. The packaging material produced in accordance with the invention shows good printability and simultaneously good adhesion of the applied polymer layer.

16 Claims, 1 Drawing Sheet

(51) Int. Cl.
| | |
|---|---|
| *B32B 27/36* | (2006.01) |
| *D21H 19/10* | (2006.01) |
| *B32B 7/12* | (2006.01) |
| *D21H 21/18* | (2006.01) |
| *D21H 19/82* | (2006.01) |
| *D21H 19/52* | (2006.01) |
| *D21H 19/84* | (2006.01) |
| *B41M 5/00* | (2006.01) |
| *B41M 7/00* | (2006.01) |
| *B41M 5/52* | (2006.01) |
| *B65D 65/40* | (2006.01) |
| *B32B 27/32* | (2006.01) |
| *D21H 19/14* | (2006.01) |
| *D21H 19/34* | (2006.01) |
| *D21H 23/70* | (2006.01) |

(52) U.S. Cl.
CPC .......... *B32B 27/36* (2013.01); *B41M 5/0017* (2013.01); *B41M 5/5218* (2013.01); *B41M 5/5236* (2013.01); *B41M 5/5254* (2013.01); *B41M 7/0036* (2013.01); *B65D 65/40* (2013.01); *D21H 19/10* (2013.01); *D21H 19/14* (2013.01); *D21H 19/34* (2013.01); *D21H 19/52* (2013.01); *D21H 19/82* (2013.01); *D21H 19/84* (2013.01); *D21H 21/18* (2013.01); *D21H 23/70* (2013.01); *B32B 2307/4023* (2013.01); *B32B 2307/4026* (2013.01); *B32B 2307/75* (2013.01); *B32B 2439/70* (2013.01)

(58) Field of Classification Search
CPC .......... B32B 27/32; B32B 27/36; B32B 7/12; B41M 5/0017; B41M 5/5218; B41M 5/5236; B41M 5/5254; B41M 7/0036; B65D 65/40; D21H 19/10; D21H 19/14; D21H 19/34; D21H 19/52; D21H 19/82; D21H 19/84; D21H 21/18; D21H 23/70; D21H 27/10
See application file for complete search history.

(56) References Cited

U.S. PATENT DOCUMENTS

| | | | | |
|---|---|---|---|---|
| 5,401,562 A | * | 3/1995 | Akao | ............... B32B 27/10 428/211.1 |
| 6,051,106 A | * | 4/2000 | Omura | ............... B41M 5/52 162/135 |
| 6,120,784 A | * | 9/2000 | Snyder, Jr. | ............... C09D 5/14 423/236 |
| 6,207,258 B1 | * | 3/2001 | Varnell | ............... B41M 5/0017 428/32.1 |
| 2002/0064633 A1 | * | 5/2002 | Wakata | ............... B41M 5/52 428/32.39 |
| 2003/0174195 A1 | | 9/2003 | Onishi et al. | |
| 2004/0027436 A1 | * | 2/2004 | Kaieda | ............... B41J 2/1433 347/103 |
| 2006/0100338 A1 | | 5/2006 | Andersson et al. | |
| 2009/0244477 A1 | * | 10/2009 | Pugh | ............... B29D 11/00826 351/158 |
| 2011/0104408 A1 | | 5/2011 | Wang et al. | |
| 2011/0303113 A1 | | 12/2011 | Sarkisian et al. | |
| 2012/0128949 A1 | | 5/2012 | Goto | |
| 2012/0308790 A1 | | 12/2012 | Backfolk et al. | |
| 2013/0095333 A1 | | 4/2013 | Pal et al. | |
| 2013/0176369 A1 | * | 7/2013 | Gotou | ............... B41J 2/2107 347/100 |
| 2013/0224450 A1 | | 8/2013 | Wingkono et al. | |
| 2013/0266746 A1 | | 10/2013 | Huang et al. | |
| 2013/0278690 A1 | * | 10/2013 | Saito | ............... B41J 2/2107 347/102 |
| 2015/0050435 A1 | * | 2/2015 | Pal | ............... B41M 5/502 428/32.25 |
| 2015/0140237 A1 | * | 5/2015 | Schmidt | ............... B41M 5/5236 428/32.34 |

FOREIGN PATENT DOCUMENTS

| | | |
|---|---|---|
| EP | 2732976 A2 | 5/2014 |
| JP | A2004017984 | 1/2004 |
| JP | 2008523167 A | 7/2008 |
| JP | 2013510222 A | 3/2013 |
| JP | 2014500805 A | 1/2014 |
| WO | 0181679 A2 | 11/2001 |
| WO | 02028637 | 4/2002 |
| WO | 2006049546 | 5/2006 |
| WO | 2011056130 | 5/2011 |
| WO | 2012044229 | 4/2012 |
| WO | 2012047162 A1 | 4/2012 |
| WO | 2012114121 A2 | 8/2012 |
| WO | 2013027103 A1 | 2/2013 |
| WO | 2013186367 A1 | 12/2013 |

OTHER PUBLICATIONS

Tetra Pak—Development in brief, http://assets.tetrapak.com/static/documents/9704en.pdf, May 31, 2013.

* cited by examiner

METHOD FOR MANUFACTURING A PACKAGING MATERIAL AND A PACKAGING MATERIAL MADE BY THE METHOD

This application is a U.S. National Stage under 35 U.S.C. § 371 of International Application No. PCT/IB2015/051851, filed Mar. 13, 2015, which claims priority to U.S. application No. 61/952,978 filed Mar. 14, 2014.

TECHNICAL FIELD

The present invention relates to a method of manufacturing a packaging material and a packaging material made by the method.

BACKGROUND OF THE INVENTION

Fibre-based packaging materials for liquid containers and food product packages are usually provided with a barrier layer, typically in the form of a tight film on the paperboard substrate. Barrier layers in packaging materials, usually refers to the use of polymers as thin layers on the base paperboard substrate. These polymers give excellent product protection properties and are effective barriers for packaging of e.g. liquid or food products. Polymers frequently used as barriers are thermoplastic polymers such as PE (polyethylene), PP (polypropylene) and PLA (polylactic acid).

The barrier polymers may be extrusion coated or laminated onto the paperboard substrate. A good adhesion between the paperboard surface and the polymer layer is necessary to provide an efficient barrier, but also to prevent raw edge penetration and ensure good convertability. Surface treatments of paperboard in order to raise the surface energy of the surface, such as corona, plasma or flame treatment, are commonly used to enhance the adhesion between the board surface and the polymer layer.

Another important quality of packaging material is its printability. The most prevailing printing techniques for printing of packaging board materials are sheet-fed offset process, rotogravure or flexogravure. However, in recent years, digital printing and especially ink jet printing, which has previously mostly been applied in the printing of paper, has also become of interest in the printing of paperboard. Ink jet printing techniques put high demands on the printing substrate, since the ink must be quickly dried on the substrate and yet provide a high print quality. A desired print quality involves a high optical print density, minimized feathering and bleeding, good dot sharpness, high print evenness and low strike-through. The adhesion of inkjet inks, and then especially pigment-based colorants, to the paperboard surface is quite low due to the limitation set by the printing process, i.e. drop size, nozzle diameter, ejection method, etc. Typically, the viscosity and surface tension of inkjet inks are relatively low, which then may lead to a relatively weakly bounded ink layer on the board. Moreover, recent developed inks usually show a fairly weak adhesion to fibers, to enable efficient de-inking. Consequently, the adhesion of a barrier polymer layer to the printed ink layer and to the surface of the substrate may be negatively affected, due to the formed weak boundary layer (i.e. the ink layer).

In connection with printing paper, it is well-known that addition of metal salts, preferably multivalent salts such as calcium chloride, to the surface size, gives rise to a significant improvement in ink-jet print quality. U.S. Pat. No. 6,207,258 discloses a composition useful for surface treating a paper sheet for ink jet printing, the composition comprising a salt of a divalent metal. However, metal salts have not been used successfully in the treatment of packaging board material. Since packaging board materials generally has a much rougher and more porous surface than paper, the salts have a tendency to absorb and penetrate much more into the substrate, leaving much less surface accessible salts for the deposited ink colorants. Consequently, a high amount of multivalent cations is needed to get the desired effect on the printing quality. However, applying higher concentration of metal salts may cause saturation, which in turn gives rise to precipitation of the salt into crystals. Such precipitates may cause problems in the adhesion of a barrier polymer layer to the paperboard base substrate. Another risk is that the surface treatment formulations comprising binders such as starch prior for the base board might cause a weak boundary layer if the binder is not physic-chemically compatible with the multivalent metal salts. Thus, the prevailing assumption of today is that paperboard materials that is to be polymer laminated or coated cannot be treated with metal salts, since this affects the adhesion of the polymer layer negatively. One way to solve this problem is to print on the applied barrier polymer layer. However, if the ink is to be printed on the polymer layer, the ink needs to be UV, EB or based on specific solvents, which involves a safety risk.

SUMMARY OF THE INVENTION

The object of the invention is to provide a polymer extrusion coated or laminated paperboard material, suitable for packaging of e.g. foods or liquids, which paperboard material shows excellent barrier properties, good adhesion between the base board and the polymer layer and good print quality.

According to the invention, this object has surprisingly been achieved by treating at least one surface of a paperboard substrate, which substrate comprises cellulosic fibres, with a binder and with a metal salt, printing at least a part of said treated surface with ink, and applying at least one polymer layer on said printed surface.

The packaging material produced in accordance with the invention shows good printability and simultaneously good adhesion of the applied polymer layer. It has surprisingly been shown that paperboard substrates may be surface treated with a metal salt of a mono- or multivalent ion and yet allow good adhesion of a polymer layer, if a binder is applied prior to, and/or together with, the application of the mono- or multivalent metal salt to the surface. The binder prevents penetration of the metal salt into the surface of the board. Without being bound to any theory, it is believed that the binder system disclosed herein positively enhanced the accessibility of the metal salt to the deposited colorants. Consequently, the mono- or multivalent metal salt may be applied in a relatively small amount, whereby the risk for saturation, crystallisation and/or formation of precipitated binder-salt aggregates is avoided. The treatment in accordance with the invention enhances both the print quality and the adhesion of the polymer to the surface of the paperboard.

The binder applied may be chosen from the group comprising microfibrillated cellulose (MFC), nanocellulose, nanocrystalline cellulose, starch and/or polyDADMAC, carboxymethyl cellulose (CMC), polyvinylpyrrolidone (PVP), polyvinyl alcohol (PVA), polyethyleneimine (PEI) and/or polyethylene glycol (PEG) or any combination or modifications of these. In one embodiment, the binder comprises a cationic binder (e.g. cationic starch and/or polyDADMAC). Cationic binders have shown to give good adhesion of the ink particles to the substrate surface. In another preferred embodiment, the binder comprises MFC. MFC plugs the pores of the surface and thus reduce penetration of the mono- or multivalent metal salt into the substrate. The MFC may e.g. be anionic modified. Anionic modified MFC may interact with the mono- or multivalent cations thus providing cationic sites for fixation of anionic colorants. Moreover, applied MFC gives rise to a smooth surface and enhance absorption of water and/or (co-)solvent in the ink, which improves the print quality even further due to faster ink layer immobilization. MFC may be applied to the surface in an amount of at least 0.1 $g/m^2$ (dry).

The binder, e.g. MFC, may be applied to the surface as a dispersion separately from, and prior to, the application of the metal salt. In this way, the binder may form a film between the paperboard surface and the polymer and prevent penetration of the metal salt into the surface of the porous paperboard.

Alternatively, the binder and the metal salt may be added to the surface of the paperboard substrate in the same step, i.e. as a composition comprising said binder and the mono- or multivalent metal salt. This makes the process more efficient and it has been shown that the binder still prevents penetration of the metal salt into the surface of the paperboard. It has been surprisingly found, that the said binder formulations is very stable even at high electrolyte concentrations.

The binder, the metal salt and/or the composition comprising the binder and the metal salt may be applied to the surface of the paperboard substrate by use of any known application technique such as surface sizing, lamination or coating, including but not limited to, spraying, curtain coating, extrusion coating, film press coating, blade coating or foam coating.

The metal salt is of a monovalent or, more preferably, a multivalent metal, such as a divalent or trivalent metal. Said salts may e.g. be calcium chloride, aluminum chloride, magnesium chloride, magnesium bromide, calcium bromide, barium chloride, calcium nitrate, magnesium nitrate, barium nitrate, calcium acetate, magnesium acetate or barium acetate or a mixture of these. Most preferably, the salt is calcium chloride. The multivalent metal salt may be applied to the surface in an amount of at least 0.01 $g/m^2$, preferably in an amount of at least 0.1 $g/m^2$. Most preferably, the metal salt is applied to the surface in an amount of between 0.01-1 $g/m^2$. The method of the invention allows a small amount of the metal salt to be added to the surface of the substrate, and still affect the print quality positively, since the binder avoids penetration of the salt into the surface.

The polymer layer may comprise a thermoplastic polymer. The polymer may, for example, comprise polyethylene (PE), polyethylene terephthalate (PET), polypropylene (PP) and/or polylactic acid (PLA) and/or biobased materials of any of these including modifications of the mentioned thermoplastics. The polymer may be applied to the printed surface by use of any known coating or film application technique, e.g. by extrusion coating. The polymer barrier coating layer can also be applied in one or several layers.

The invention further relates to a packaging material made by the method described above. A packaging material in accordance with the invention is suitable for packaging of e.g. dry or liquid food, cosmetic or pharmaceuticals.

The invention further relates to a packaging material comprising; a paperboard substrate, a first, innermost, layer comprising a binder, a second layer, applied on said first layer, comprising a metal salt of a mono- or multivalent metal, aqueous based ink printed on at least a part of said second layer and a polymer layer applied on said printed second layer.

The invention further relates to a packaging material comprising; a paperboard substrate, an innermost layer comprising a binder and a metal salt, aqueous based ink printed on at least a part of said innermost layer, and a polymer layer applied on said printed innermost layer.

DETAILED DESCRIPTION

By "paperboard substrate comprising cellulosic fibres" is meant a base paperboard with a grammage of at least 150 gsm, more preferably of at least 180 gsm, comprising fibres from unbleached or bleached pulp which can be chemical pulp such as sulfate, kraft, soda or sulfite pulp, mechanical pulp, high refined pulp (MFC), thermomechanical pulp or chemithermomechanical pulp and the raw material can be based on softwood, hardwood, recycled fibres or non-wood suitable for making paperboard. Preferably, the paperboard substrate is a multilayer paperboard substrate comprising at least two plies, such as three plies; e.g. a top ply, a back ply and a middle ply. The paperboard substrate may be surface sized on the surface of the top ply with e.g. starch and additives including pigmentation. Also the back ply may be surface sized and/or, pigmented or single or double coated.

By "microfibrillated cellulose" (MFC) is meant a material typically made from wood cellulosic fibres, both from hardwood or softwood fibres. It can also be made from microbial sources, agricultural fibres such as wheat straw pulp, bamboo or other non-wood fibre sources. MFC is prepared from untreated, chemically (e.g. TEMPO oxidized or carboxymethylated) or enzymatically treated pulps followed by mechanically delamination of the fibers. In microfibrillated cellulose, the individual microfibrils have been detached from each other. A microfibrillated cellulose fibre is very thin (about 20 nm or less) and the length is often between 100 nm to 10 µm. However, the microfibrils may also be longer, for example between 10-200 µm. Microfibrillated cellulose (MFC) mentioned as a nanoparticle is also known as nanocellulose, nanofibrillated cellulose or cellulose nanofibrils (CNF). Nanocellulose obtained by e.g. strong hydrolysis using sulphuric acid or HCl forms cellulose nanocrystals (CNC). By all these definitions, including combination of these materials, are in this context equally meant microfibrillated cellulose, MFC.

Figure 1:
FIG. 1 is a schematic figure of a packaging material according to the invention

The packaging material shown in FIG. 1 comprises a paperboard substrate, an innermost layer (2) in direct contact with the paperboard substrate, which innermost layer comprises a binder and a multivalent metal salt. The innermost layer is printed with ink (3) and a polymer layer (4) is applied on said printed surface.

Figure 2:
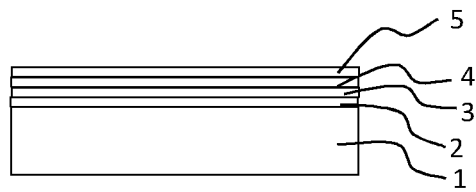
FIG. 2 is a schematic figure of a second packaging material according to the invention.

The packaging material shown in FIG. 2 comprises a paperboard substrate (1), a first, innermost, layer (2) comprising a binder, a second layer (3), applied on said first layer, which second layer comprises a metal salt, ink (4) printed on at least a part of said second layer (3) and a polymer layer (5) applied on said printed second layer.

In the context of this application, the term "innermost" means that the layer is applied directly on the paperboard substrate.

The ink used in the invention comprises pigments, or pigments and dyes, and may be aqueous or solvent based, or a mixture of aqueous and (co-)solvent thus forming a suitable carrier medium for the ink particles. Preferably, the ink comprises anionic nanoparticles (as colorants). Preferably, the ink is printed by use of inkjet printing, thus most preferably high speed inkjet either reel to reel or sheet fed, but other printing techniques are also applicable, such as flexographic, offset, liquid toner electrophotography printing and/or hybrid printing meaning for example a combination of flexography and inkjet. The substrate may be provided with an additional primer layer before being printed with the ink comprising pigments. Such a primer layer may comprise salt or ink without pigments and can be applied with either normal flexography, rotogravure methods which are obvious for a person skilled in the art. Thus, an additional primer layer can also be applied with the high speed inkjet prior to deposition of the inkjet inks.

The packaging material of the invention may be provided with further barrier layers. The back ply may e.g. be provided with polymer barriers in one or several layers.

Example

In order to evaluate the paperboard materials of the invention, a test series was performed in which the print quality and the polymer adhesion of paperboards treated in accordance with the invention was compared with a conventional, untreated, paperboard. All paperboards in the test were of a three-ply construction, having top and back plies and a middle ply. The top ply comprised bleached sulphate pulp, the middle ply comprised CTMP and unbleached sulphate pulp and the back ply comprised unbleached sulphate pulp. The basis weight of the paperboards was approximately 255 gsm. The inventive samples (2-5) were blade coated (blade coater equipped with applicator roll) in an amount of approximately 3 g/m$^2$ with multivalent metal salt (CaCl2) and binder in accordance with table 1.

Comparative tests were performed on the reference paperboard (sample 1) and the paperboards of the invention (sample 2-5). All samples were printed with a Kodak desktop printer ESP 5 with colour ink cartridge 10, CAT394 7066 and black ink cartridge 10, CAT 394 7058 (The said ink is comprises nanoparticle colorants). The print quality was evaluated by measuring Optical (Print) Density (OD), print mottle and horizontal bleeding. "Optical Density" was measured by color filter according to DIN 16536, by use of Greta Macbeth D19C 47B/P. SUM YCM means the sum of yellow, cyan and magenta, 100% tone areas, and is an indicative of the colour density. "Print Mottle" was measured in accordance with ISO 13660 by use of Scanner IAS. "Horizontal bleeding black" means that the bleed of a black line printed on yellow printed background is measured in accordance to ISO 13660, by use of Scanner IAS.

TABLE 1

|  | Sample 1 (ref) | Sample 2 | Sample 3 | Sample 4 | Sample 5 |
| --- | --- | --- | --- | --- | --- |
| Cationic starch (15%), [pph] |  | 70 | 50 |  | 60 |
| MFC (2%), [pph] |  |  |  | 60 |  |
| CaCl2 (30%) [pph] |  | 30 | 20 | 20 | 20 |
| PolyDADMAC [pph] |  |  |  | 20 | 20 |
| CMC [pph] |  |  | 30 |  |  |
| Optical Density, K100 [ ] | 1.7 | 2.6 | 2.8 | 2.6 | 2.8 |
| Optical Density | 2.4 | 3.4 | 3.5 | 3.4 | 3.7 |

TABLE 1-continued

|  | Sample 1 (ref) | Sample 2 | Sample 3 | Sample 4 | Sample 5 |
| --- | --- | --- | --- | --- | --- |
| SUM YCM100 [ ] Print mottle, magenta (100% area). [ ]-comment other same trend | 2.3 | 1.2 | 1.0 | 0.6 | 0.7 |
| Horizontal Bleeding black, line width [μm] | 1680 | 1350 | 1340 | 1330 | 1320 |

The print quality measurements are also summarized in table 1. The comparison shows that the print quality was remarkable better for the samples treated in accordance with the invention compared to the reference paperboard. The highest optical density, lowest mottle and lowest bleeding were observed for the sample treated with polyDADMAC, starch and salt.

All paperboards were thereafter coated in a blade coater with polyethylene in an amount of approximately 14 g/m$^2$. The polymer adhesion to the reference paperboard (sample 1), to the paperboard treated with MFC, polyDADMAC and salt and to the paperboard treated with polyDADMAC, starch and salt was measured. The polymer adhesion measurements are summarized in table 2.

TABLE 2

|  | Sample 1 (ref) | Sample 4 | Sample 5 |
| --- | --- | --- | --- |
| PE adhesion, [N/m] | 70.9 | 67.4 | PE was too tight to release. |

As can be seen in table 2, the paperboard treated with MFC, polyDADMAC and metal salt showed comparable polymer adhesion as the reference board, while the paperboard treated with polyDADMAC, cationic starch and metal salt showed much stronger polymer adhesion. Thus, the results show that the treatment according to the invention gives rise to paperboard with much higher print quality and comparable or enhanced polymer adhesion.

The invention claimed is:

1. A method of manufacturing a packaging material comprising the steps of:
    providing a paperboard substrate, comprising cellulosic fibres,
    treating at least one surface of said substrate with a binder and with a metal salt or combination of metal salts, wherein a total amount of metal salts applied to the surface is in the range of 0.01 g/m$^2$ to 1 g/m$^2$, wherein the metal salt is selected from the group consisting of calcium chloride, aluminium chloride, magnesium chloride, magnesium bromide, calcium bromide, calcium nitrate, magnesium nitrate, magnesium acetate, barium acetate, or combinations thereof, wherein the binder comprises polydiallyldimethylammonium chloride (polyDADMAC) in combination with at least one co-binder selected from microfibrillated cellulose (MFC), or starch,
    printing at least a part of said treated surface with ink, and
    applying at least one polymer layer on said printed surface, wherein adhesion of the treated surface to the at least one polymer layer is greater than adhesion of the treated surface to the at least one polymer layer when the binder is polydiallyldimethylammonium chloride (polyDADMAC) alone.

2. A method according to claim 1, wherein the binder comprises MFC which is applied to the surface in an amount of at least 0.1 g/m$^2$.

3. A method according to claim 1, wherein the binder comprises starch which is applied to the surface in an amount of at least 0.1 g/m$^2$.

4. A method according to claim 1, wherein the polydiallyldimethylammonium chloride (polyDADMAC) is applied to the surface in an amount of at least 0.05 g/m$^2$.

5. A method according to claim 1, wherein the binder is applied in a separate step, prior to the treatment of the surface with the metal salt.

6. A method according to claim 1, wherein the treatment with the binder and the metal salt is done by addition of a composition comprising a binder and a metal salt to the surface of the paperboard substrate.

7. A method according to claim 1, wherein the polymer layer comprises polyethylene (PE), polyethylene terephthalate (PET), polypropylene (PP), polylactic acid (PLA), or combinations thereof, or biobased materials of any of these.

8. A method as in claim 1, wherein the total amount of metal salts applied to the surface is in the range of 0.1 g/m$^2$ to 1 g/m$^2$.

9. A method according to claim 1 wherein the metal salt is selected from the group consisting of aluminium chloride, magnesium bromide, calcium bromide, calcium nitrate, magnesium nitrate, magnesium acetate, barium acetate, or combinations thereof.

10. A method according to claim 1 wherein the metal salt is selected from the group consisting of calcium chloride, aluminium chloride, magnesium chloride, magnesium bromide, calcium bromide, calcium nitrate, magnesium nitrate, magnesium acetate, barium acetate, or combinations thereof.

11. A method of manufacturing a packaging material comprising the steps of:

providing a paperboard substrate, comprising cellulosic fibres, treating at least one surface of said substrate with a binder and with a metal salt or combination of metal salts, wherein the metal salt or combination of metal salts is selected from the group consisting of calcium chloride, aluminium chloride, magnesium chloride, magnesium bromide, calcium bromide, calcium nitrate, magnesium nitrate, magnesium acetate, barium acetate, or combinations thereof, wherein the binder comprises polydiallyldimethylammonium chloride (polyDADMAC) in combination with at least one co-binder selected from microfibrillated cellulose (MFC), or starch, and wherein a total amount of metal salts applied to the surface is in the range of 0.01 g/m$^2$ to 1 g/m$^2$, printing at least a part of said treated surface with ink, and applying at least one polymer layer on said printed surface, wherein adhesion of the treated surface to the at least one polymer layer is greater than adhesion of the treated surface to the at least one polymer layer when the binder is polydiallyldimethylammonium chloride (polyDADMAC) alone.

12. A method according to claim 11, wherein the total amount of metal salts applied to the surface is in the range of 0.1 g/m$^2$ to 1 g/m$^2$.

13. A method according to claim 11, wherein the co-binder is applied to the surface in an amount of at least 0.1 g/m$^2$.

14. A method according to claim 11, wherein the binder is applied in a separate step, prior to the treatment of the surface with the metal salt.

15. A method according to claim 11, wherein the treatment with the binder and the metal salt is done by addition of a composition comprising a binder and a metal salt to the surface of the paperboard substrate.

16. A method according to claim 11, wherein the polymer layer comprises polyethylene (PE), polyethylene terephthalate (PET), polypropylene (PP), polylactic acid (PLA), or combinations thereof, or biobased materials of any of these.

* * * * *